United States Patent Office 3,445,392
Patented May 20, 1969

3,445,392
NONFOAMING PERFLUORINATED POLYETHERS
William Henry Gumprecht and Rulon Edward Johnson, Jr., New Castle County, Del., assignors to E. I. du Pont de Nemours and Company, Wilmington, Del., a corporation of Delaware
No Drawing. Filed May 18, 1967, Ser. No. 639,311
Int. Cl. C10m 3/24; C07c 43/00
U.S. Cl. 252—54                                                                   3 Claims

---

ABSTRACT OF THE DISCLOSURE

Nonfoaming lubricants of the formula $$C_3F_7O[CF(CF_3)CF_2O]_nCF_2CF_3$$

having an average molecular weight of about 2000–8500 and a volatility range no broader than about 140 degrees on the centigrade scale.

---

BACKGROUND OF THE INVENTION

This invention relates to mixtures of perfluorinated polyethers of the formula $$C_3F_7O[CF(CF_3)CF_2O]_nCF_2CF_3$$

and more particularly to such mixtures having an average molecular weight of about 2000–8500 which are nonfoaming.

In U.S. Patent 3,242,218, Miller discloses perfluorinated polyethers of the formula $$C_3F_7O[CF(CF_3)CF_2O]_nCF_2CF_3$$

wherein $n$ indicates the degree of polymerization. These polyethers are excellent lubricants, hydraulic fluids and the like. They are essentially immune to attack by air and corrosive chemicals even at very high temperatures. However, problems have arisen with respect to the tendency of these perfluorinated polyethers to foam in use. Since foaming in a lubricant or hydraulic fluid can lead to severe difficulties during use, it is desirable to provide such polyethers which do not foam.

The process by which these polyethers are prepared involves the polymerization of hexafluoropropylene oxide to polymers of the formula $$C_3F_7O[CF(CF_3)CF_2O]_nCF(CF_3)COF$$

conversion of the acid fluoride group in the polymer to the free acid, and fluorination of the free acid with elemental fluorine. Incomplete conversion during the fluorination step would leave residues of free acid which are known to be surface active. Accordingly, one might assume that the foaming tendency of these polyethers is due to the presence of these residues, particularly since analogous lubricating mixtures such as paraffin oils generally do not have a tendency to foam, if pure. However, the removal of these impurities has not overcome the tendency of perfluorinated polyethers to foam.

DESCRIPTION OF THE INVENTION

It has now been discovered that the tendency of perfluorinated polyethers to foam can be overcome by providing a mixture of perfluorinated polyethers of the formula $$C_3F_7O[CF(CF_3)CF_2O]_nCF_2CF_3$$

wherein $n$ indicates the degree of polymerization, having a number average molecular weight of about 2000–8500 and a volatility range no broader than about 140 degrees on the centigrade scale. Quite surprisingly, it has been found that the wide molecular weight distribution normally associated with perfluorinated polyethers is the cause of their foaming. In accordance with this invention, a narrowing of the molecular weight distribution of these polyethers, as indicated by their limited volatility range, has been found to result in an elimination of their foaming tendency.

The products of this invention are prepared from hexafluoropropylene oxide polymers of the formula $$C_3F_7O[CF(CF_3)CF_2O]_nCF(CF_3)COF$$

wherein $n$ indicates the degree of polymerization. These polymers are prepared by polymerizing hexafluoropropylene oxide using a charcoal catalyst, as taught by Moore and Milian in U.S. Patent 3,250,808, or a metal fluoride catalyst, as taught by Moore in Canadian Patent 725,740. The continuous process taught by Arbogast in U.S. application Ser. No. 546,682, filed May 2, 1966, is used to obtain products having a number average molecular weight in excess of about 5500. In accordance with that process, the catalyst system is most commonly an alkali metal fluoride dispersed in a diluent. A number of diluents are disclosed, but the dimethyl ethers of either ethylene glycol or polyethylene glycol are particularly advantageous due to the relatively high solubility of the catalyst in them.

In accordance with the teachings of Miller in U.S. Patent 3,242,218, the hexafluoropropylene oxide polymer is first converted to the corresponding acid by hydrolysis with water. The acid is then decarboxylated and fluorinated by reaction with elemental fluorine at 50–300° C., and preferably at 150–250° C.

In accordance with this invention, the perfluorinated polyether mixture must have a volatility range no broader than about 140 degrees on the centigrade scale. By "breadth of volatility range" is meant the difference in volatility temperature between the lowest boiling component and the highest boiling component in the mixture. Although simple boiling range determinations give meaningful data with respect to the breadth of volatility ranges, thermogravimetric analysis is considerably more reliable. Thermogravimetric analysis is described by Slade and Jenkins in Techniques and Methods of Polymer Evaluation, volume 1, 1966, Marcel Dekker Inc., New York.

The volatility range of the polymeric mixture under constant test conditions is a function of its molecular weight distribution, that is, the range of values of $n$ in $$C_3F_7O[CF(CF_3)CF_2O]_nCF_2CF_3$$

As the molecular weight distribution widens, so does the volatility range. The volatility range is therefore a convenient and easily determined measure of molecular weight distribution.

Unlike the molecular weight distribution, the average molecular weight of a polymeric mixture is not a function of the volatility range. Although the average molecular weight of a polymeric mixture is a function of the molecular weight of the individual oligomers and the relative amounts of each, the average molecular weight itself gives no information concerning the molecular weight distribution. Indeed, samples having the same average molecular weight can vary quite widely in their molecular weight distribution.

The perfluorinated polyethers obtained by the fluorination process of the Miller patent will have the same molecular weight distribution as the acid fluoride polymerization products from which they are derived. Usually, the undesirably low molecular weight materials are removed from the acid fluoride polymerization product by a stripping distillation operation before subjecting the acid fluoride to hydrolysis and fluorination. While this operation shifts the average molecular weight to a slightly higher value by removing the lower molecular weight fraction, it does not, by itself, sufficiently narrow the molecular weight distribution to materially affect the tendency of the fluorination product to foam.

To obtain perfluorinated polyether products having the required volatility range, fractionation of the original acid fluoride polymerization product or the subsequent fluorination product is necessary. If properly carried out, each of the fractions obtained will be nonfoaming and thus little, if any, product is actually lost. Similar fractions from several production runs may be combined for use or several fractions of a single run may be reblended within the volatility range requirements of this invention.

The perfluorinated polyethers of this invention have two major uses, as lubricants and as hydraulic fluids. For hydraulic use, the polyethers generally have number average molecular weights of about 2000–5500. For general use, average molecular weights of 3000–4500 are preferred. For hydraulic uses involving exceptionally high operating temperatures, the higher average molecular weights in the range of 4500–5500 are preferred.

For lubricant purposes, the number average molecular weight is generally in the range of 4500–8500. In most cases, average molecular weights of 4500–7000 are used. Where extreme temperatures are involved as in modern aircraft engines, average molecular weights of about 5500 to 7000 are preferred. Higher average molecular weights, up to about 8500, may be required in some circumstances. To avoid foaming in any of these polyethers, the volatility range must be no broader than 140 degrees on the centigrade scale.

The following examples, illustrating the preparation and foaming properties of the products of this invention, are given without any intention that the invention be limited thereto.

Example I

In order to show that the foaming tendency of perfluorinated polyether oils is due to molecular weight distribution rather than average molecular weight, the following tests were carried out. Five samples of perfluorinated polyether oils of the structure $$C_3F_7O[CF(CF_3)CF_2O]_nCF_2CF_3$$

which had been stripped to remove low boiling components were tested for volatility range and foaming tendency by the methods described below. The following results were obtained.

TABLE I

| Oil | Average molecular weight | Volatility range, °C. | Breadth of volatility range, °C. | Foam at 75° F., ml./min. to break |
|---|---|---|---|---|
| 1 | 4,500 | 205–400 | 195 | 390/10.5 |
| 2 | 4,700 | 310–400 | 90 | 0/0 |
| 3 | 4,950 | 190–490 | 300 | 254/26 |
| 4 | 5,200 | 295–405 | 110 | 0/0 |
| 5 | 6,000 | 275–515 | 240 | 530/50 |

The foaming characteristics were determined using ASTM Test Method D892-63 (Method 3211.3, Federal Test Method Standard No. 791) at 75° F. The results are reported as depth of foam in milliliters/time necessary for the foam to break in minutes. Thermogravimetric analyses were carried out using standard equipment in an atmosphere provided by introducing 0.25 cubic ft./min. of helium with a temperature rise of 3° to 6° C./min. and a sample size of about 200 milligrams. The indicated molecular weights are number averages as determined by the spectroscopic method.

Example II

Oil 3 in Example I was fractionally distilled into eight fractions of equal volume and a pot residue using a highly efficient fractionating column at 0.05 mm. Hg. Each fraction was tested for foaming as in Example I. The results are shown in Table II.

TABLE II

| Fraction | Average molecular weight | Boiling range, °C. | Breadth of boiling range, °C. | Foam at 75° F., ml./min. to break |
|---|---|---|---|---|
| 1 | 2,500 | 119–181 | 62 | Nil. |
| 2 | 3,350 | 181–206 | 25 | Nil. |
| 3 | 3,720 | 206–220 | 14 | Nil. |
| 4 | 4,500 | 220–241 | 21 | Nil. |
| 5 | 5,080 | 241–263 | 22 | Nil. |
| 6 | 5,620 | 263–280 | 17 | Nil. |
| 7 | 6,140 | 280–305 | 25 | Nil. |
| 8 | 6,910 | 305–339 | 34 | Nil. |
| Residue | 8,460 | >339 | | Nil. |

Portions of each fraction were then recombined in the same ratio as they existed in the original oil. The resulting mixtures were again tested for foaming. The results are shown in Table III.

TABLE III

| Combined fractions | Breadth of boiling range, °C. | Foam at 75° F., ml./min. to break |
|---|---|---|
| 3–7 | 99 | Nil. |
| 3–8 | 133 | Nil. |
| 2–7 | 124 | Nil. |
| 2–8 | 158 | Slight. |
| 2-residue | >158 | 75/10. |
| 1–8 | 220 | 55/5. |
| 1-residue | >220 | 210/31. |

Although the invention has been described and exemplified by way of specific embodiments, it is to be understood that it is not limited thereto. As will be apparent to those skilled in the art, numerous modifications and variations of the embodiments illustrated above may be made without departing from the spirit of the invention or the scope of the following claims.

The embodiments of the invention in which an exclusive property or privilege is claimed are defined as follows.

We claim:
1. A nonfoaming mixture of perfluorinated polyethers of the structure $C_3F_7O[CF(CF_3)CF_2O]_nCF_2CF_3$, wherein $n$ indicates the degree of polymerization, having a number average molecular weight of 2000–8500 and a volatility range no broader than 140 degrees on the centigrade scale when using standard equipment in an atmosphere provided by introducing 0.25 cubic ft./min. of helium with a temperature rise of 3° to 6° C./min. and a sample size of about 200 milligrams.
2. The mixture of claim 1 having a number average molecular weight of from 3000 to 5500.
3. The mixture of claim 1 having a number average molecular weight of from 5500 to 7000.

References Cited
UNITED STATES PATENTS

| 3,242,218 | 3/1966 | Miller | 252—54 X |
| 3,214,478 | 10/1965 | Milian | 252—54 X |
| 3,250,808 | 5/1966 | Moore et al. | 252—54 X |
| 3,306,853 | 2/1967 | Fogg et al. | 252—54 X |

DANIEL E. WYMAN, *Primary Examiner.*

W. CANNON, *Assistant Examiner.*

U.S. Cl. X.R.

260—615